J. H. LEVILLAIN.
SCALE ATTACHMENT FOR VEHICLES.
APPLICATION FILED APR. 5, 1910.

1,024,639.

Patented Apr. 30, 1912.
2 SHEETS—SHEET 1.

Inventor
John H. Levillain,

Witnesses
Chas. C. Richardson.
John A. Nonegay.

By Victor J. Evans
Attorney

J. H. LEVILLAIN.
SCALE ATTACHMENT FOR VEHICLES.
APPLICATION FILED APR. 5, 1910.
1,024,639.
Patented Apr. 30, 1912.
2 SHEETS—SHEET 2.
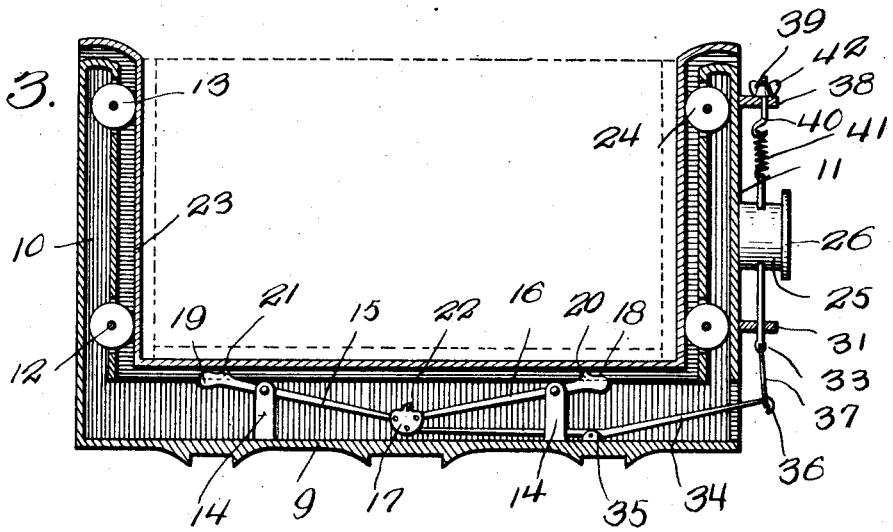
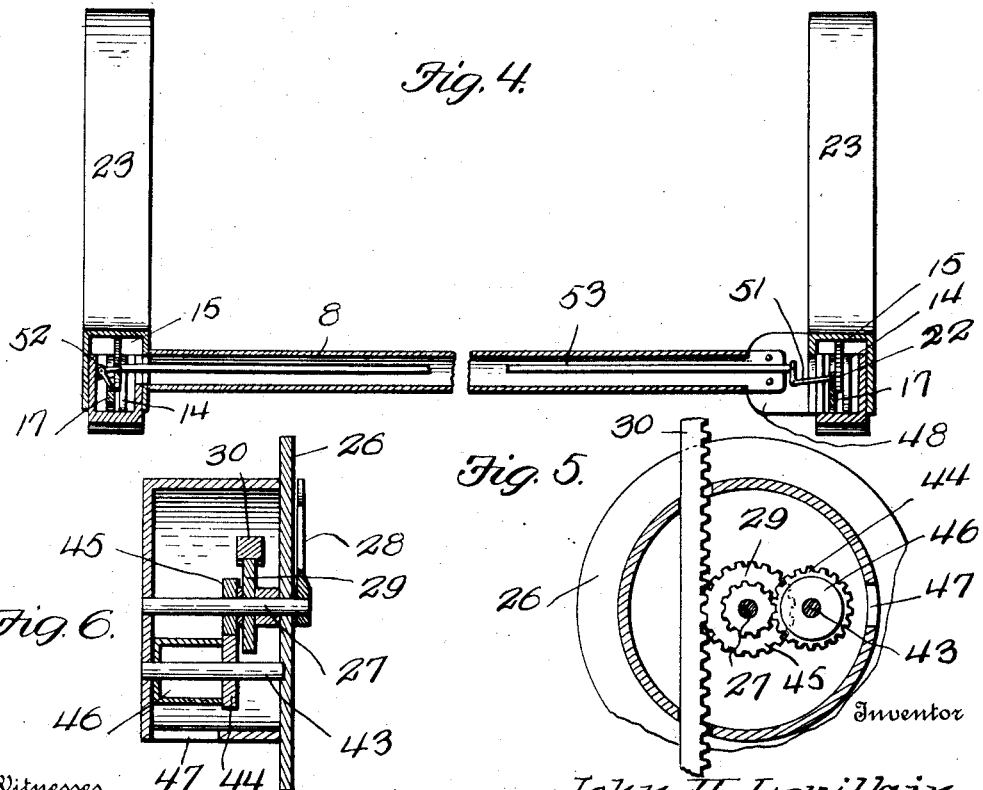
Witnesses
Chas. C. Richardson.
John A. Dungay.
Inventor
John H. Levillain
By Victor J. Evans
Attorney

UNITED STATES PATENT OFFICE.

JOHN H. LEVILLAIN, OF LORING, LOUISIANA.

SCALE ATTACHMENT FOR VEHICLES.

1,024,639.  Specification of Letters Patent.  Patented Apr. 30, 1912.

Application filed April 5, 1910. Serial No. 553,520.

*To all whom it may concern:*

Be it known that I, JOHN H. LEVILLAIN, a citizen of the United States, residing at Loring, in the parish of Sabine and State of Louisiana, have invented new and useful Improvements in Scale Attachments for Vehicles, of which the following is a specification.

This invention relates to improvements in scale attachments for vehicles and has for one of its objects the provision of a device, whereby the load or weight of the quantity of material placed in the body of a vehicle may be readily determined.

Another object is the provision of a construction wherein the unequal distribution of the load in the body of the vehicle will have no effect whatever upon the weighing mechanism.

With these and other objects in view, which will more fully hereinafter appear, the present invention consists in certain novel details of construction and arrangement of parts, hereinafter fully described, illustrated in the accompanying drawings and more particularly pointed out in the appended claims; it being understood that various changes in the form, proportion, size, and minor details of the device may be made, within the scope of the appended claims, without departing from the spirit or sacrificing any of the advantages of the invention.

Figure 1:
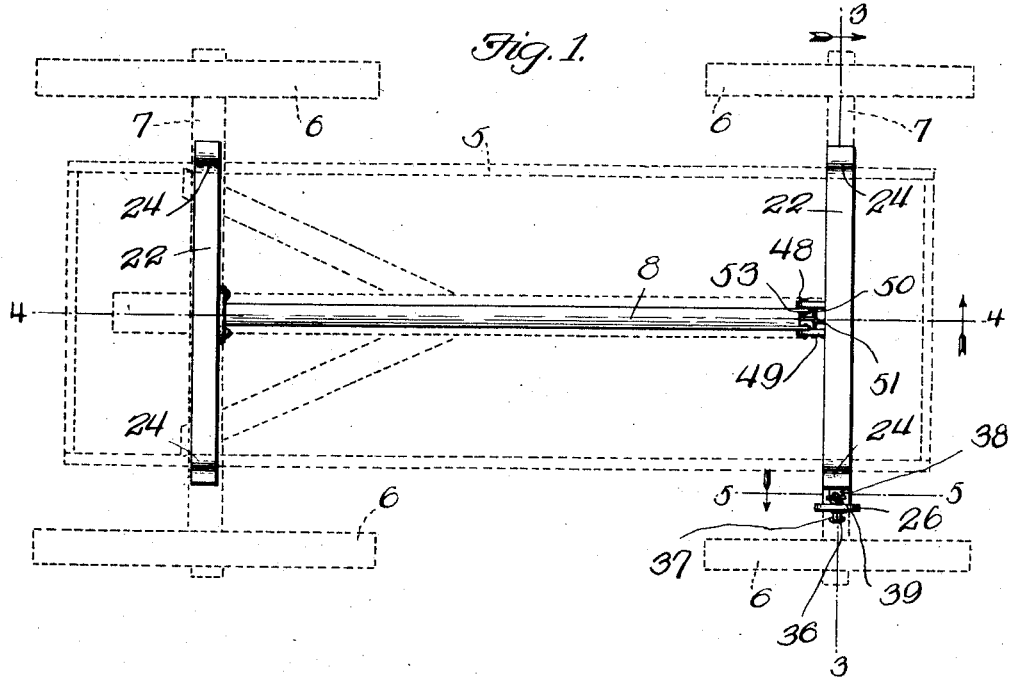
Figure 2:
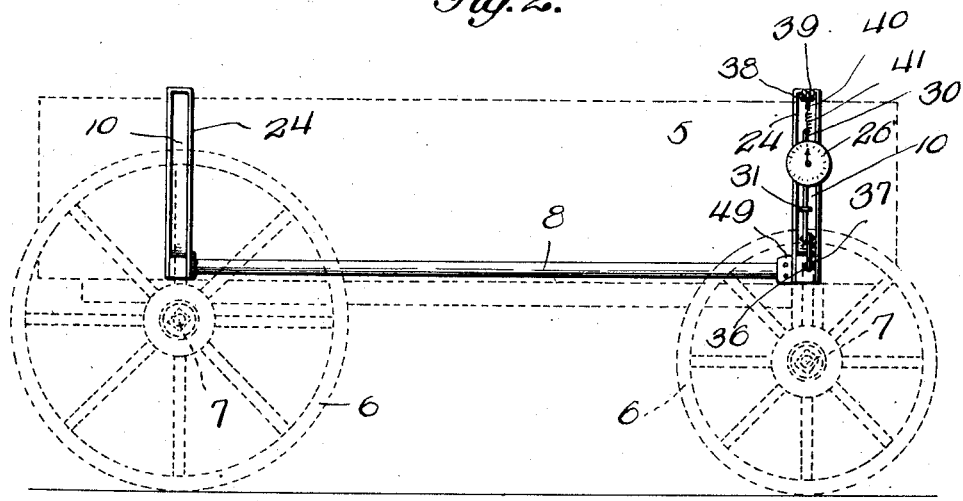

In the accompanying drawings, forming a part of the specification;—Figure 1 is a plan view of the device showing its application to an ordinary vehicle. Fig. 2 is a side elevation of the same. Fig. 3 is a sectional end view on the line 3—3 of Fig. 1. Fig. 4 is a longitudinal sectional view on the line 4—4 of Fig. 1. Fig. 5 is a sectional front elevation on the line 5—5 of Fig. 1 and looking in the direction of the arrow. Fig. 6 is a sectional end elevation taken through the indicator.

Similar numerals of reference are employed to designate corresponding parts throughout.

The body of the vehicle is designated in general by the numeral 5, the wheels by the numeral 6, the axle by the numeral 7 and the hound or reach connecting the axles by the numeral 8.

Arranged longitudinally, and in the usual manner, of the axle 7 are front and rear bolsters designated by the numeral 9. These members are channeled, their open sides being presented upwardly, and terminate at their opposite ends in vertical stakes 10 and 11, the said stakes being hollow and provided adjacent to their upper and lower ends with openings in which are rotatably mounted on shafts 12, friction rollers 13, portions of the peripheries of which extend in advance of the inner faces of the stakes. By reference to Figs. 3 and 4 it will be seen that the front and rear bolsters 9 are interiorly provided on either side of their medial portions with upstanding lugs or ears 14. As shown in Fig. 4 it will be seen that these lugs are arranged in pairs and have fulcrumed therebetween levers 15 and 16. The levers 15 and 16 normally incline downwardly and toward the center of the bolster and at their lower ends are connected by means of a plate 17 having extending therefrom pins for the loose reception of the lower ends of the levers. The upper ends of the levers terminate in oblong heads 18 and 19, the upper sides of which are provided with spurs 20 and 21, which normally lie above the horizontal plane of the upper surfaces of the bolsters. By reference to Fig. 3 it will be seen that the levers are fulcrumed adjacent to their free ends, whereby their lower ends will normally incline downwardly.

A pair of stirrups are shown in Figs. 1 to 4 inclusive which support the wagon body 5. These stirrups conform to the outline of the bolsters and stakes and are channeled to receive the said bolsters and stakes. The horizontal portions of the stirrups are designated by the numeral 22, and are somewhat less in length than the length of the bolsters, while the vertical side portions of the stirrups are designated by the numerals 23 and 24 and are a trifle greater in length than the length of the stakes 10 and 11. By virtue of the channeling of the stirrups, the said channel being formed on the outer faces of the sides 23 and 24 and lower face of the horizontal side 22, the bolster and stakes will be normally housed by the stirrups, while the outer faces of the channels of the sides 23 and 24 will bear on the friction rollers 12 and 13. By reference to Fig. 3 it will be seen that by virtue of the spurs 20 and 21 projecting above the upper faces of the bolsters, the horizontal portions 22 of the stirrups will bear on these spurs and tend to force the free ends of the levers downwardly, whereby the connected ends of the said levers will tend to move upwardly.

The mechanism for indicating the weight borne by the stirrups comprises a casing 25. This member, as shown in Fig. 3 is secured to the outer face of one of the front stakes 11 and its outer end is provided with a dial 26 in the center of which is journaled a shaft 27, the outer end of which is provided with an indicator hand 28. Keyed to the shaft 27 and within the casing is a spur gear 29, and extending through opposite openings in the casing is a vertically disposed rack bar 30, the teeth of which mesh with the spur gear 29. The lower end portion of the rack bar 30 extends through a guide 31 projecting laterally from the lower end portion of the stake 11 and terminates in an eye 33.

An angular-shaped arm 34 has its medial portion pivoted on the interior of the bolster as shown at 35, while the inner end of the same is pivoted to the plate 17 which connects the levers 15 and 16. The free end portion of the arm 34 extends upwardly and outwardly and through an oblong opening formed in the lower side of the stake 11 and terminates in a downwardly curved end 36, which lies below the eye 33 of the rack. Connection between the eye 33 and downwardly curved end 36 is established by means of a link 37, as shown in Fig. 3.

Extending laterally from the upper end portion of the stake 11 is a lug 38, in vertical alinement with the lug 31. Extending through this lug 38 is a screw-threaded shank 39, the lower end of which terminates in a hook 40. A connection between the said hook 40 and upper end of the rack bar 30 is established by means of a helical retractile spring 41. The threaded shank 39 is held against movement in the lug 38 by means of a tension nut 42 screwed onto the shank 39 and bearing on the lug 38. With this construction it will be manifest that when sufficient weight is placed upon the stirrups to move the same downwardly, the inner or connected ends of the levers 15 and 16 will move upwardly carrying with them the inner end of the arm 34. The upward movement of the inner end of the arm 34 will cause the outer or free end to move in an opposite direction, whereby the rack bar 30 will move downwardly against the action of the spring 41 and during its downward movement will rotate the spur gear 29 and the indicator hand 28, whereby the weight necessary to cause this movement of the parts will be indicated by the hand 28 on the dial 26. The weight indicated by the hand 28 will usually be in hundreds and in order that the fractional parts of a hundred may be determined the following construction is employed:—By reference to Fig. 6 it will be seen that journaled in the casing 25 and parallel with the shaft 27 is a shaft 43 and keyed to this shaft 43 is a spur gear 44, the teeth of which mesh with a pinion 45 keyed to the shaft 27 and to the rear of the spur gear 29. Secured to the rear of the shaft 43 is a drum 46 having imprinted thereon the fractional parts of a hundred and formed in the side of the casing 25 and in alinement with the middle of the drum is an opening 47, through which a portion of the surface of the drum may be seen, so that when the indicator moves in the manner before described rotary movement will be imparted to the drum, whereby a certain number will be visible through the opening 47, thus indicating the fraction of a hundred contained by the body 5.

In order that the unequal distribution of the load in the wagon body will have no effect whatever upon the proper manipulation of the scale the following construction is employed:—By reference to Fig. 1 it will be seen that extending rearwardly from the medial portion of the front bolster are a pair of lugs 48 and 49 and fulcrumed between these lugs on a shaft 50, is a bell crank lever 51, one arm of which extends substantially horizontal and through an opening in the bolster and has its inner end pivoted to the upper side of the plate 17, while the opposite or outer arm extends vertically upward. Reference now to Fig. 4 discloses the fact that pivoted in the rear bolster and to the rear of the plate connecting the levers thereof is a bell crank 52, one arm of which inclines downward and is pivoted to the upper side of the plate which connects the levers 15 and 16 in the rear bolster, and the opposite arm of which extends forwardly. Connection between the forwardly extending arm of the bell crank 52 and vertically extending arm of the bell crank 51 is established by means of a connecting rod 53 the opposite ends of which are pivoted to said arms. With this construction it will be manifest that when the load is distributed over the rear portion of the body 5, a downward movement on the rear stirrup will cause the forwardly extending arm of the bell crank 52 to move upwardly, carrying with it the connecting rod 53, whereby the bell crank 51 will be rocked and the plate 17 and inner ends of the levers 15 and 16 and arm 34 move upwardly to operate the scale.

From the foregoing, it is evident that I have provided a device which is comparatively simple in structure, and inexpensive in manufacture, embodying few parts and these so arranged that the danger of derangement will be reduced to a minimum.

I claim:—

1. In a wagon scale, a channeled bolster, a channeled stirrup housing said bolster, a pair of levers fulcrumed on said bolster and pivotally connected at one end, a pivoted arm connected at one end with said levers, and a yielding connection between said bolsters and arm and serving to hold the free ends of said levers in engagement with said stirrup.

2. In a wagon scale, a support having hollow vertical portions, rollers journaled on said portions and projecting inwardly thereof, a pair of levers pivotally connected to each other at their inner ends, pivot supports for the outer ends of the levers, a weight holder engaging the outer ends of the levers and having vertical portions engaging the rollers, an arm pivotally connected with the inner ends of the levers and pivoted to said support, and a weight indicating device connected with said arm, whereby the outer ends of the levers are held in normal engagement with the weight holder.

3. In combination, a support having hollow vertical portions, rollers journaled on the inner walls of said hollow vertical portions, a wagon bed having vertical sides engaging said rollers, arms pivotally connected to each other and pivotally supported below said wagon bed, a lever pivotally supported below said wagon bed and having pivot connection with the inner ends of the arms, indicating means connected with said lever and a spring coöperating with said indicating means adapted to hold said wagon bed in a normally elevated position.

In testimony whereof I affix my signature in presence of two witnesses.

JOHN H. LEVILLAIN.

Witnesses:
T. D. SIDLARRY, Jr.,
A. W. BRYAN.

---

Copies of this patent may be obtained for five cents each, by addressing the "Commissioner of Patents, Washington, D. C."